(12) United States Patent
Hirai et al.

(10) Patent No.: US 6,473,389 B2
(45) Date of Patent: Oct. 29, 2002

(54) LENS ACTUATOR

(75) Inventors: Yukio Hirai; Akihiko Makita; Gorou Kawasaki; Nobuyuki Kanto, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/757,147

(22) Filed: Jan. 9, 2001

(65) Prior Publication Data
US 2001/0003521 A1 Jun. 14, 2001

Related U.S. Application Data

(63) Continuation of application No. PCT/JP99/00489, filed on Feb. 4, 1999.

(30) Foreign Application Priority Data

Jul. 17, 1998 (JP) ............................................ 10-203117

(51) Int. Cl.[7] .............................................. G11B 7/135
(52) U.S. Cl. .................................... 369/244; 369/44.15
(58) Field of Search ............................. 369/244, 44.15, 369/118, 112.01, 112.03, 112.04, 112.05, 112.23, 112.24, 44.16, 44.22

(56) References Cited

U.S. PATENT DOCUMENTS

| 5,012,369 A | * | 4/1991 | Owe et al. ................. 360/244.5 |
| 5,218,587 A | * | 6/1993 | Nomiyama et al. ....... 369/44.16 |
| 5,299,183 A | * | 3/1994 | Yamaguchi ............... 369/44.14 |
| 5,663,843 A | * | 9/1997 | Ezawa et al. ............... 359/824 |
| 5,719,834 A | * | 2/1998 | Futagawa et al. ......... 369/44.14 |
| 5,793,407 A | | 8/1998 | Park et al. |
| 6,104,691 A | * | 8/2000 | Yamamoto et al. .......... 369/188 |
| 6,108,292 A | * | 8/2000 | Zijp ............................. 369/112 |
| 6,178,157 B1 | * | 1/2001 | Berg et al. ................... 369/300 |

FOREIGN PATENT DOCUMENTS

| EP | 0 727 777 A1 | * | 8/1996 | |
| JP | 51-33603 | | 3/1976 | |
| JP | 03119582 A | * | 5/1991 | ........... G11B/21/21 |
| JP | 04355219 A | * | 12/1992 | ............ G11B/7/09 |
| JP | 5-73980 | * | 3/1993 | |
| JP | 7-141712 | | 6/1995 | |
| JP | 8-180453 | | 7/1996 | |
| JP | 08-221790 | | 8/1996 | |
| JP | 10-188333 | | 7/1998 | |
| JP | 11-273124 | * | 10/1999 | |
| JP | 11-339303 | * | 12/1999 | |

* cited by examiner

Primary Examiner—William Klimowicz
(74) Attorney, Agent, or Firm—Greer, Burns & Crain, Ltd.

(57) ABSTRACT

A lens actuator of an optical head for an optical disc drive includes a two-dimensional actuator supported by a carriage via a spring, a second lens held by the two-dimensional actuator, a slider supported by the two-dimensional actuator and floated off a turning optical disc, and a first lens held by the slider. A laser beam is focused on the optical disc by an object lens system which includes the first lens and the second lens. The slider is supported by the two-dimensional actuator via a support having a predetermined spring constant in the focus directions while also having freedom to follow tilting of the optical disc.

12 Claims, 9 Drawing Sheets

LENS ACTUATOR

This is a continuation of PCT/JP99/00489, filed on Feb. 4, 1999, which was not published in English.

TECHNICAL FIELD

The present invention relates to a lens actuator, and more specifically to a lens actuator for an optical head of an optical disc drive. In this specification, optical disc drives include not only an optical disc drive dedicated exclusively to reading of optical discs but also a magneto-optical disc drive capable of reading and writing in magneto-optical discs by means of magnetic field modulation or optical pulse modulation.

BACKGROUND OF THE INVENTION

An optical disc drive has been widely used as a high-capacity external storing apparatus for a computer or the like. Toward the advent of the forthcoming era of multimedia, there is an increasing demand for higher density recording. One measure which the optical head may adopt for increasing the recording density of the optical disc drive is to reduce the spot diameter of a laser beam. The spot diameter of a laser beam is proportional to $\lambda/NA$, where $\lambda$ represents the wavelength of the source laser beam and NA represents the number of apertures of the object lens in the head. Therefore, the beam spot diameter is reduced by decreasing the wavelength of semiconductor laser, or by increasing the NA of the object lens in the head.

However, decrease of the wavelength of semiconductor laser, namely utilization of blue semiconductor laser, still encounters problems with respect to cost, output efficiency, temperature stability and so on, posing difficulty in practical utilization at the present time.

On the other hand, the option of increasing the NA of the object lens in the head is also problematic because if the goal is to be achieved by a single lens, the radius of curvature of the lens needs to be rendered small. Then, tolerances with respect to the lens surface curvature and dimensions in production of the lens have to be accordingly small, making difficult to manufacture an appropriate lens. Further, errors increase with respect to tilt and eccentricity between the surfaces of a lens (between the incidence and the exit surface), tilt and eccentricity in the lens itself, coma caused by tilt of the disc (proportional to NA to the third power ), and spherical aberration caused by inconsistent thickness of the disc (proportional to NA to the fourth power). These errors make it difficult to carry out recording onto the disc as well as reading from the disc.

JP-A-8-221790, for example, proposes an optical pickup device for solving the above-described problem. As shown in FIG. 11, the optical pick up device disclosed in this publication comprises an object lens system including two separate lenses, i.e., a first object lens 11 and a second object lens 12 each having a relatively small NA. The second object lens 12 is held by a tube m, whereas the first object lens 11 is held by a slider s supported by the tube m via an elastic member b in between. When the disc is driven, the slider s slidably contacts a disc surface or floats off the disc surface via an air film (air bearing) in between.

With the optical pickup device having the above structure, the overall NA of the object lens system increases due to the combination of the two lenses each having a relatively small NA, providing basis for meeting the demand for recording density increase. Further, the problem associated with the single-lens approach, i.e., the problem arising from the decreased radius of curvature in the lens is reduced. Still further, according to the description of JP-A-8-22179, the wave aberration is reduced since the slider s follows the disc surface.

In the case where the slider slidably contacts the disc, the slider will follow the disc surface almost perfectly and it will be possible to reduce the wave aberration. In this case, however, there is a problem that the disc will be scratched. For this reason, the slider should preferably be floated off the disc surface for protecting the disc surface or for maintaining the strength of the slider. However, if the slider floats off the disc via an air bearing, the following problems may arise.

Specifically, the reduction in the wave aberration achieved by the object lens system including the first object lens 11 and the second object lens 12 as proposed in the above publication can be achieved only on the assumption that the slider changes its posture following the disc, thereby reducing fluctuations in the distance and in the inclination (tilt) of the first object lens relative to the disc. If the slider floats via the air bearing which is formed by an air stream flowing between the turning disc and the slider, the amount of floatation and the amount of tilt of the slider relative to the disc actually fluctuate due to various factors such as temperature, relative speed between the disc and the slider (which varies depending on the radial location of the track on the disc), elastic load applied to the slider, machining errors in the disc and the slider, and so on. If the goal of high-density recording and reading is to be achieved by increasing the NA of the object lens system, tolerances allowed for the optical head are extremely small. Therefore, the structure in which the object lens system is simply provided by the first object lens and the second object lens with the first object lens held by the slider which follows the disc, the data recording/reading characteristics may deteriorate by fluctuations in the amount of floatation and tilt of the slider relative to the disc caused by the various factors mentioned above.

It is therefore an object of the present invention to appropriately reduce fluctuations in the amount of floatation and/or in the amount of tilt of the lens held by the slider relative to the disc in an optical disc drive of the type wherein a lens held by the slider which floats off the disc when the disc drive is operating is combined with another lens for increasing the NA of the object lens system in an optical head.

SUMMARY OF THE INVENTION

According to the present invention, a lens actuator of an optical head for an optical disc drive is provided which comprises a two-dimensional actuator supported by a carriage via a spring and driven to displace in focus directions and track directions, a second lens including at least one lens held by the two-dimensional actuator, a slider supported by the two-dimensional actuator and floated off a turning optical disc via an air bearing; and a first lens including at least one lens and held by the slider, whereby a laser beam is focused on the optical disc by means of an object lens system which includes the first lens and the second lens, wherein the slider is supported by the two-dimensional actuator via a support having a predetermined spring constant in the focus directions while also having freedom to follow tilting of the optical disc.

Since the optical head lens actuator according to the present invention also utilizes a plurality of lenses for increasing the overall NA of the object lenses, it is possible to increase the recording/reading density. Of the above lenses, the first lens including at least one lens closer to the disc is held by the slider which is floated off the disc via an air bearing. Since the slider basically follows the tilt of the disc surface, it is possible to reduce the wave aberration.

Thickness inconsistency and warping of the disc cause dynamic fluctuations of the disc surface height and tilt when the disc is turning. Therefore, in order to allow the slider to follow the above dynamic fluctuations of the disc surface for maintaining the amount of floatation and tilt with respect to the disc surface as constant as possible, the load applied against the disc must be controlled. According to the present invention, the two-dimensional actuator displaceable in the focus directions and in the track directions supports the slider via the support which has a predetermined spring constant. Thus, it is possible to dynamically control the load of the slider applied against the disc by moving the two-dimensional actuator in the focus directions. The control basically utilizes a focus error signal which reflects the location of the slider, as a carrier for the first lens, from the recording surface of the disc. The focus error signal is used as a feedback signal in controlling the driving electric current for the two-dimensional actuator in the focus directions. In this way, once the fluctuations of the floatation are reduced by controlling the load of the slider applied against the disc, the fluctuations in the amount of tilt of the slider relative to the disc are automatically reduced, because according to the present invention the support holding the slider on the two-dimensional actuator has freedom to follow the tilt of the disc, though having a predetermined spring constant in the focus directions.

When the control to the load applied onto the slider toward the disc is performed as described above by controlling the driving electric current for the two-dimensional actuator in the focus directions in response to a focus error signal as a feedback signal, the control can dynamically follow the fluctuations of the disc surface if the following conditions are met. Specifically, the inventors of the present invention found it preferable that the support for supporting the slider on the two-dimensional actuator has a resonance frequency higher than the resonance frequency of the spring for supporting the two-dimensional actuator on the carriage and lower than the resonance frequency of the air bearing formed between the slider and the optical disc. This will be further described later.

According to a preferred embodiment, the two-dimensional actuator is supported by the carriage via a support spring.

According to another preferred embodiment, the support for supporting the slider on the two-dimensional actuator holds the slider on two opposite sides thereof.

According to a further preferred embodiment, the support for supporting the slider on the two-dimensional actuator is spiral.

Other features and advantages of the present invention will become clearer from the following detailed description to be presented with reference to the accompanied drawings.

BEST MODE FOR CARRYING OUT THE INVENTION

Figure 1:
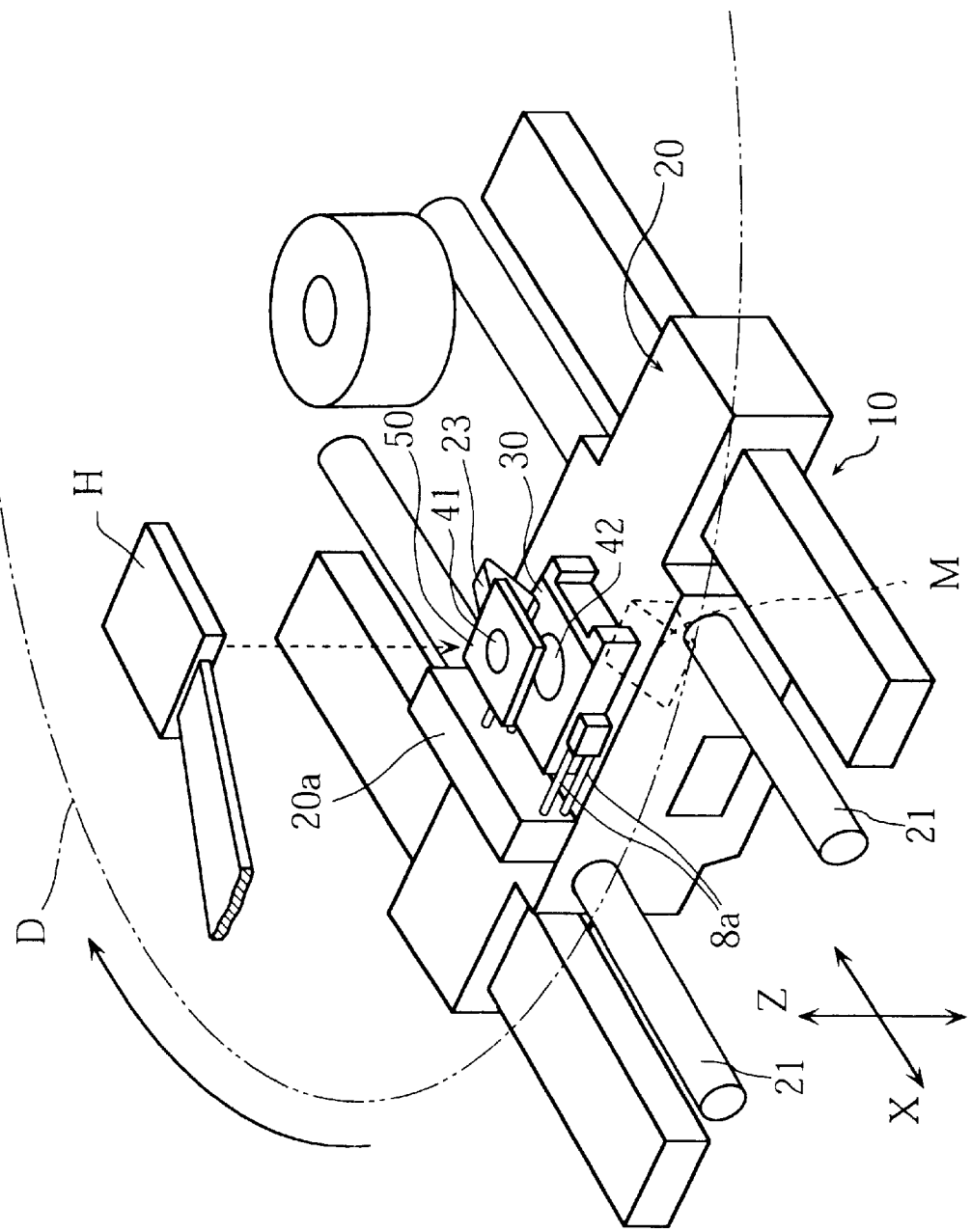
FIG. 1 is a perspective view showing a principal portion of a lens actuator of an optical head for an optical disc drive according to the present invention.
Figure 2:
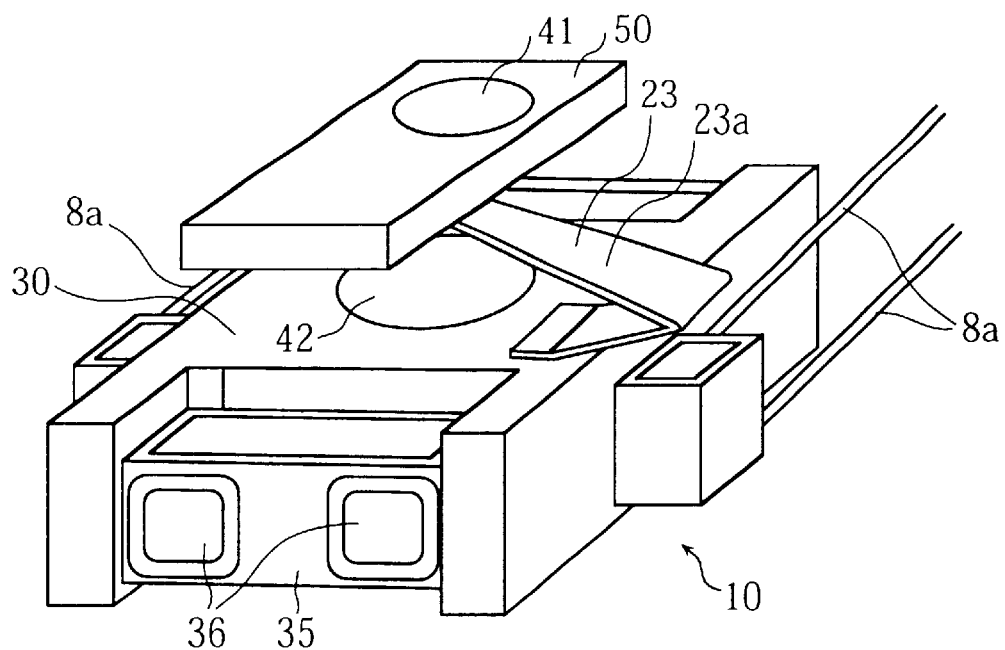
FIG. 2 is an enlarged perspective view of the principal portion of the lens actuator shown in FIG. 1.

FIG. 1 and FIG. 2 show an embodiment of a lens actuator 10 for an optical head of an optical disc drive according to the present invention. The lens actuator 10 is mounted on a carriage 20 movable in track directions (directions X). The carriage 20 is supported by guide members 21 for movement in the track directions, and suitably driven in the track directions by a linear driving mechanism such as a linear voice coil motor. The carriage 20 supports a two-dimensional actuator 30 for displacement in the track directions and the focus directions (directions Z). The actuator 30 holds a lens 42 constituting an object lens in combination with a lens 41 supported by a slider 50 to be described later. For the sake of convenience, hereinafter, the lens supported by the actuator 30 is referred to as a second lens 42, and the lens supported by the slider 50 to be described later is referred to as a first lens 41. The second lens 42, which includes only one lens according to the embodiment shown in the figures, may alternatively include a plurality of lenses. In FIG. 1, the reference sign M designate a mirror for deflecting a laser beam incident in the direction X to the upright direction Z, whereas the reference sign H indicates a floating magnetic head.

The actuator 30 is elastically supported by four springs 8a projecting generally horizontally from the support 20a on the carriage 20 for displacement in the focus directions (directions Z) and the track directions (directions X). However, since the four springs 8a, the support 20a and the carriage 20 form a structure similar to a parallelogram pantograph in both the focus directions and the track directions, the posture of the actuator 30 does not change much even upon displacement in the focus directions and the track directions. The actuator 30 is provided with a focus coil 35 and a track coil 36 so that it is located in the magnetic field generated by a magnetic circuit including these coils above the carriage 20. Thus, the actuator can be driven two-dimensionally in the focus directions and the track directions following the Fleming's law by selectively applying electric current to the focus coil 35 and the track coil 36.

Figure 4:
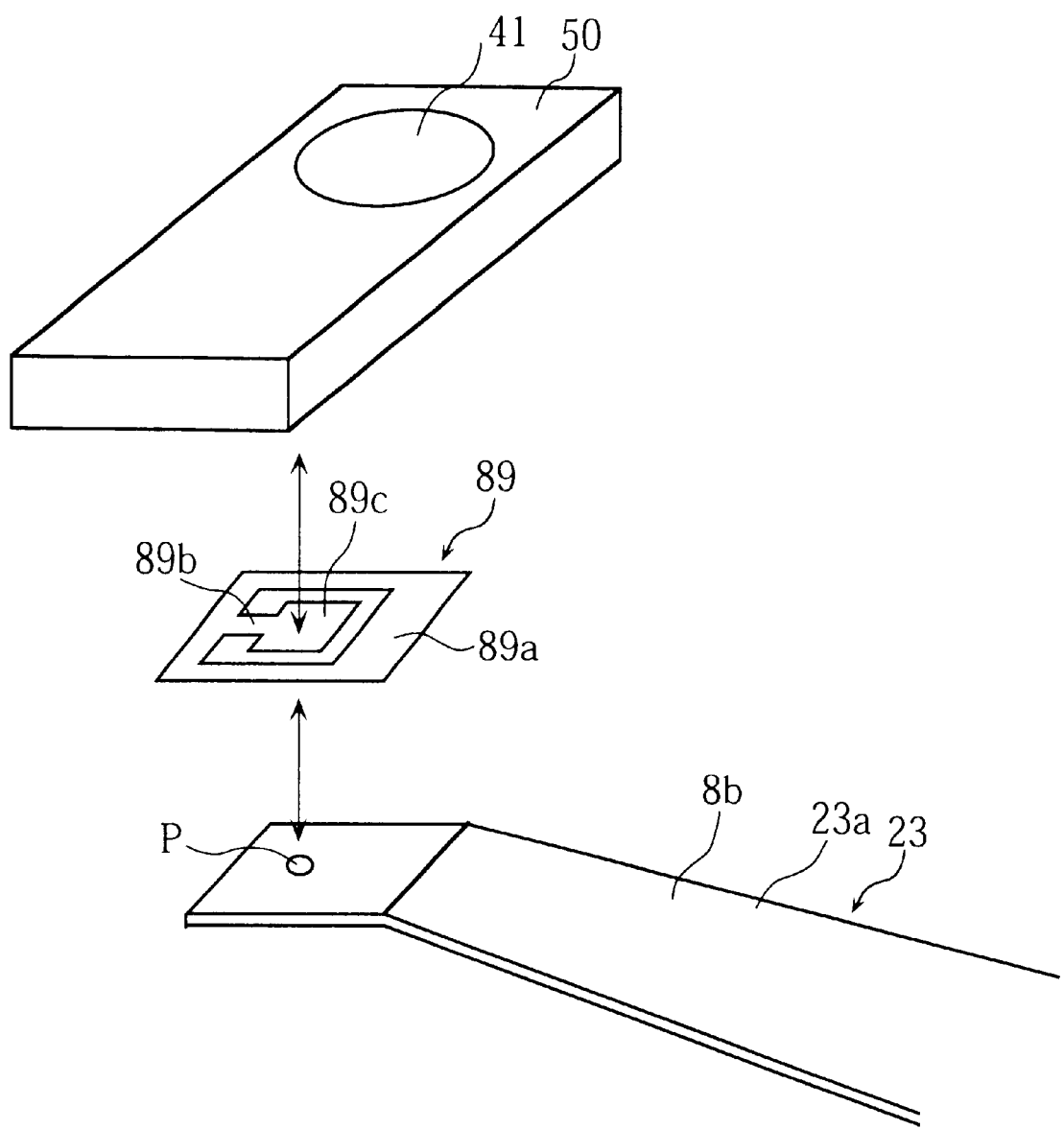
FIG. 4 is an exploded perspective view illustrating a principal portion of a supporting structure of a slider in the lens actuator shown in FIG. 1.

The actuator 30 supports the slider 50 via a support 23 having a predetermined spring constant in the focus directions. According to the present embodiment, the support 23 comprises a bent leaf spring 23a. Further, according to the present embodiment, a gimbal spring 89 shown in FIG. 4 is provided at a connection between the slider 50 and the tip of the leaf spring 23a, so that the slider 50 is freely tiltable relative to the leaf spring 23a. The gimbal spring 89, which is formed by punching an elastic thin plate, includes a frame portion 89a and a center portion 89c disposed inside the frame 89a via a connecting neck portion 89b. The center portion 89a has a relatively large rigidity against a force parallel to the plane of the frame portion 89a while exhibiting a relatively small rigidity against an external tilting force. Therefore, if the frame portion 89a is fixed to the tip of the leaf spring 23a for example with the center portion 89c is fixed to an appropriate portion of the bottom surface of the slider 50, the slider 50 can tilt substantially freely in all directions about a pivot point P on the gimbal spring 89. With this structure, therefore, the slider 50 is supported by the two-dimensional actuator 30 for free tilting under a predetermined spring constant in the focus directions.

Figure 5:
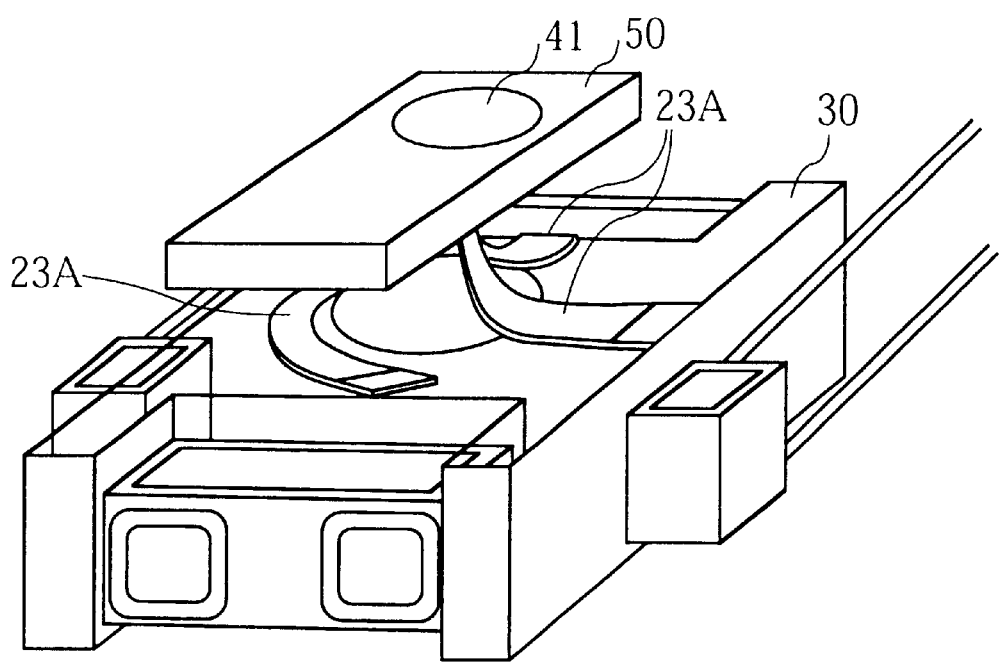
FIG. 5 is a perspective view showing another supporting structure of the slider.
Figure 6:
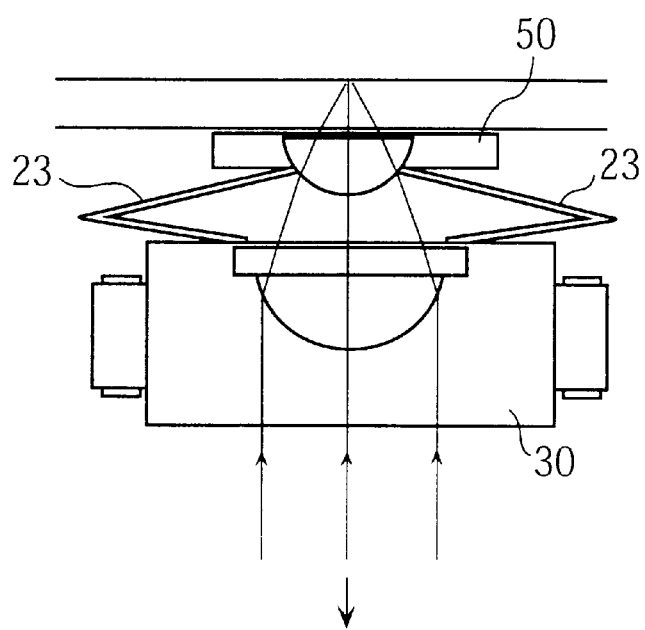
FIG. 6 is a side view showing still another supporting structure of the slider.

The specific structure for supporting the slider 50 on the two-dimensional actuator 30 is not limited to the one shown in FIG. 4. The important point here is that the slider 50 is supported by the two-dimensional actuator 30 for free tilting under a predetermined spring constant in the focus directions. Such requirements of the present invention for support of the slider 50 may be met for example by the structure shown in FIG. 5 where the slider 50 is supported by a plurality of spiral springs 23A. Further, while the support 23 provides a cantilever support according to the present embodiment shown in FIG. 1 and FIG. 2, two supports 23 may be arranged to support the slider on both sides for improving stability by reducing horizontal displacement of the slider under elastic deformation of the supports 23, as shown in FIG. 6.

The slider 50 holds the first lens 41 to coincide in optical axis with the second lens 42 supported by the two-dimensional actuator 30. Again, according to the present embodiment, the first lens comprises only one lens, but a plurality of lenses may be alternatively provided as in the case of the second lens 42. As described above, in the optical head 10 according to the present invention, the second lens 42 held by the two-dimensional actuator 30 is combined with the first lens 41 held by the slider 50 to provide the function of an object lens system for focusing the laser beam from a laser beam source on the recording surface of the optical disc D. Therefore, the overall NA can be increased even if each of the lenses 41, 42 has a small NA, providing basis for increasing the recording and reading high density.

Figure 7:
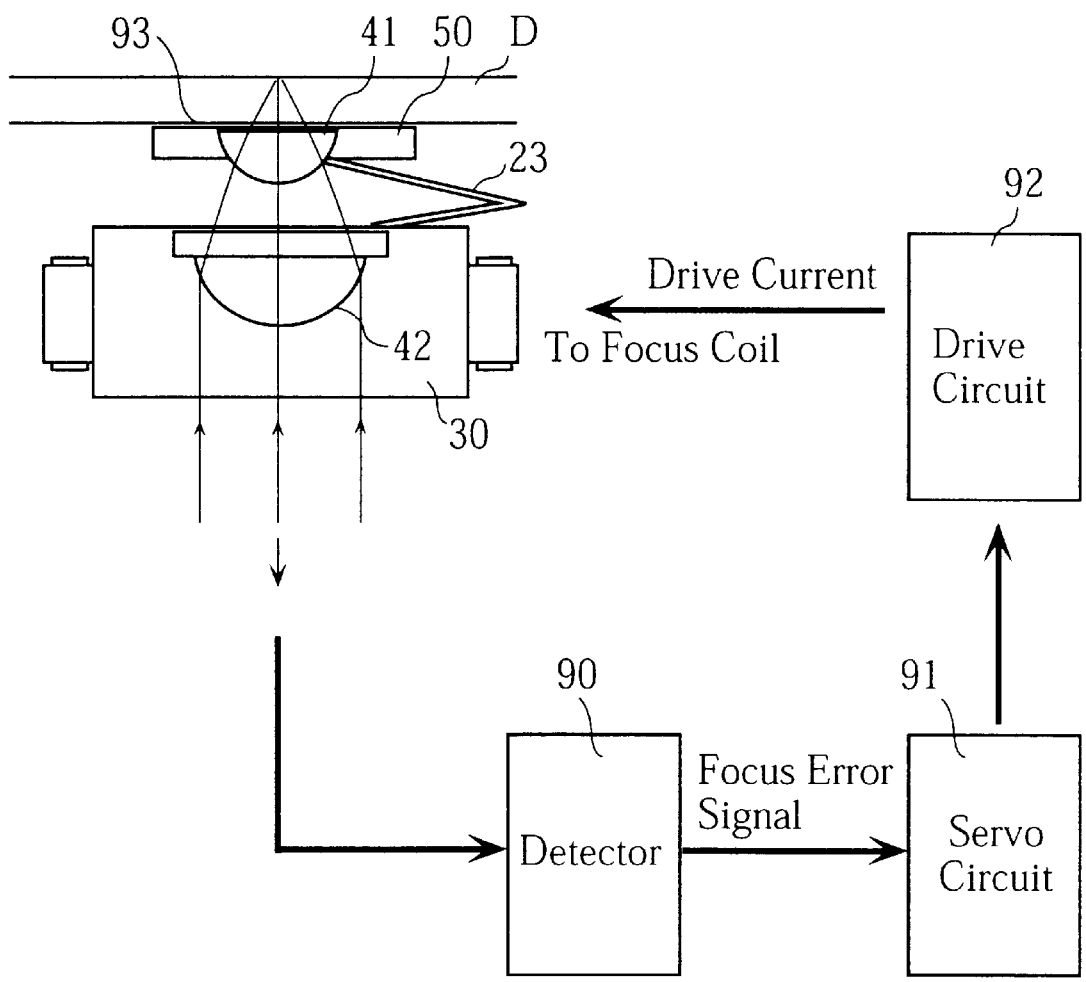
FIG. 7 is a diagram illustrating a method of controlling a driving electric current for focusing movement of the lens actuator.

As shown in FIG. 7, the light emitted from a non-illustrated semiconductor laser beam source is focused on the recording surface of the optical disc D by the second lens 42 and the first lens 41, and returns along the same path. The returning light is separated by a beam splitter and enters a detector 90 through a servo lens. The detector 90 obtains a focus error signal, i.e. a signal indicating if the beam spot created by the second lens 42 and the first lens 41 is focused on the recording surface of the disc D or out of the focus thickness-wise of the optical disc D. A focus controlling operation by means of the two-dimensional actuator 30, i.e., a control operation by which the beam spot is focused on the recording surface of the optical disc D, may be performed by conventional focus servo control in which the focus error signal is inputted as a feedback signal into a servo circuit 91, thereby controlling a focus coil driving circuit 92.

Figure 3:
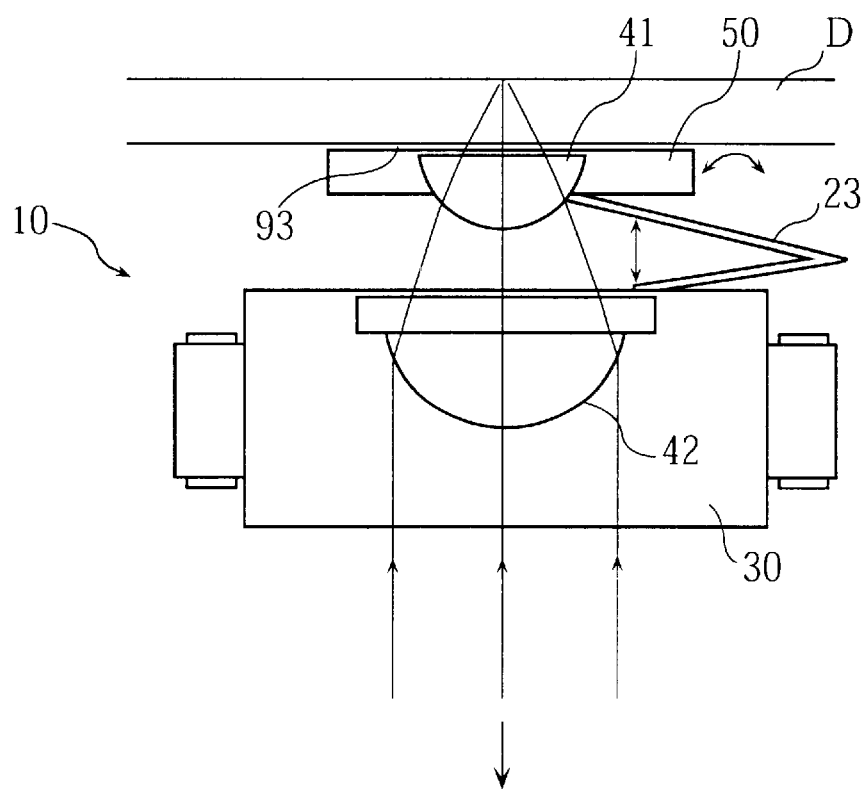
FIG. 3 is a diagram illustrating the operation of the lens actuator in FIG. 1.
Figure 8:
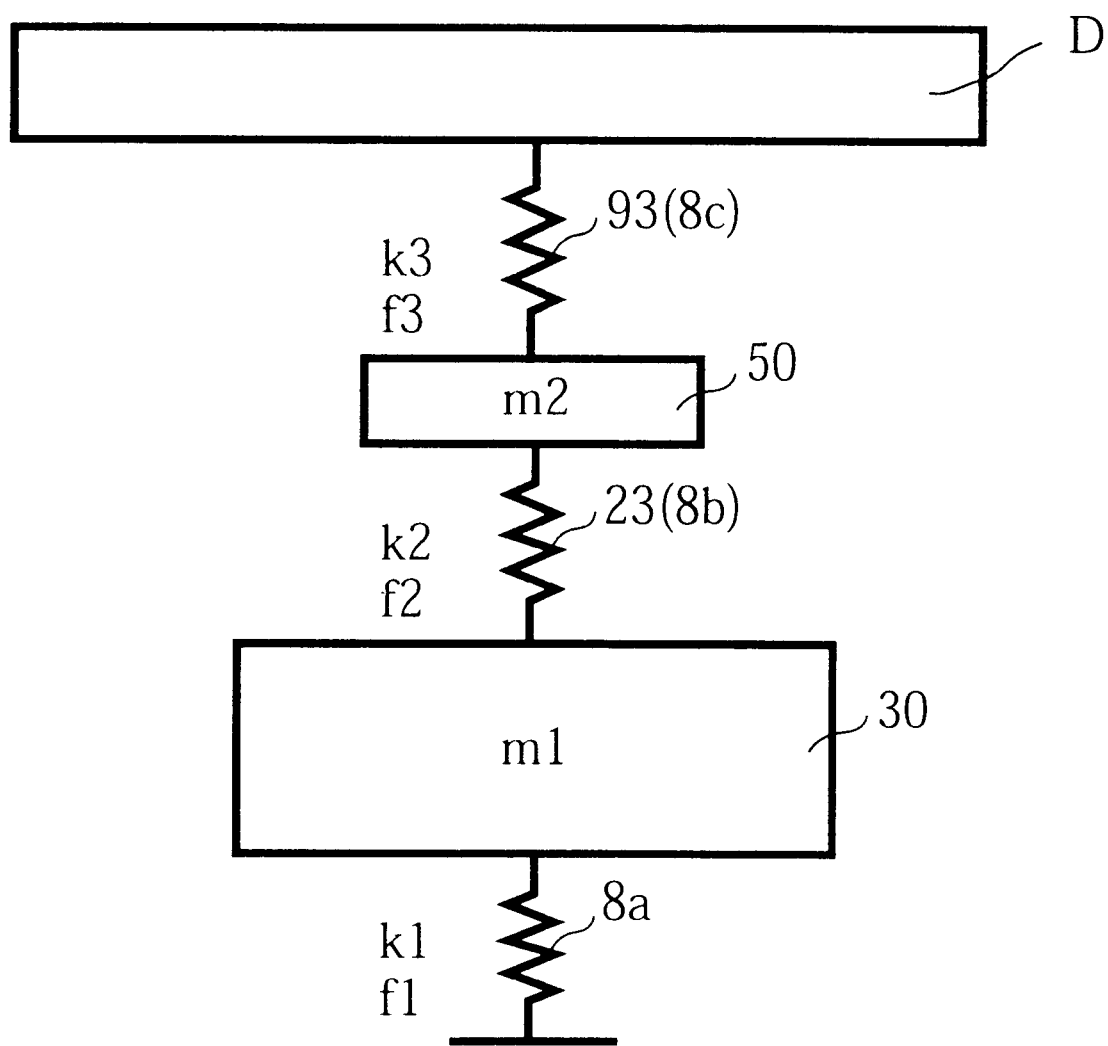
FIG. 8 is a diagram showing a model of a spring system in the lens actuator shown in FIG. 1.

Now, as clearly shown in FIG. 3, when the optical disc D is turning, the slider 50 is floated off the disc surface by an air bearing 93 provided by an airflow between the disc surface and the slider. The air bearing 93 functions as a compressed fluid spring. FIG. 8 is a system diagram wherein the two-dimensional actuator 30 is supported on the carriage 20 by the four springs 8a, wherein the slider 50 is supported with respect to the two-dimensional actuator 30 via the support 23 having a predetermined spring constant in the focus directions, and wherein the air bearing 93 serves as a compressed fluid spring formed between the slider 50 and the optical disc D. Here, the resonance frequency f1 of the spring 8a, the resonance frequency f2 of the spring 8b, and the resonance frequency f3 of the spring 8c are defined respectively by the following expressions (1), (2) and (3), where k1 represents the spring constant of the springs 8a supporting the actuator 30 to the carriage 20, m1 represents the mass of the actuator 30, k2 represents the spring constant of the support 23 (spring 8b) supporting the slider 50 on the actuator 30, m2 represents the mass of the slider 50, and k3 represents the spring constant of the air bearing 93 (spring 8c). In order for the slider 50 to appropriately follow dynamic surface fluctuations of the turning optical disc D, the resonance frequency f1 of the spring 8a must be close to the turning frequency of the optical disc D, whereas the resonance frequency f3 of the air bearing 93 (the spring 8c) must be high to satisfy the requirements for the surface-following characteristics in a low frequency range.

$$f1 = \frac{1}{2\pi}\sqrt{\frac{k1}{m1}} \tag{1}$$

$$f2 = \frac{1}{2\pi}\sqrt{\frac{k2}{m2}} \tag{2}$$

$$f3 = \frac{1}{2\pi}\sqrt{\frac{k3}{m3}} \tag{3}$$

Now, the amount of floatation of the slider 50 off the optical disc surface changes depending upon temperature, disc circumferential speed, load applied onto the slider 50 toward the optical disc D, machining errors of the slider 50 and the support supporting the slider, and so on. It is possible to suppress fluctuations in the amount of floatation of the slider 50 by adjusting the load applied to the slider 50 toward the optical disc D. According to the present invention, since the slider 50 is supported by the two-dimensional actuator 30, the load applied onto the slider 50 is controlled by adjusting the focus current of the actuator 30, thereby reducing the fluctuations in the amount of floatation of the slider 50. Further, the fluctuations in the amount of floatation of the slider 50 are contained in the focus error signal as an offset representing fluctuations of the distance between the first lens 41 and the recording surface of the optical disc D. Therefore, by performing the conventional focus servo control, in which the focus error signal itself is used as a feedback as described earlier, it is possible to automatically control the load applied onto the slider for the reduction of the fluctuations in the amount of floatation of the slider 50.

The inventors of the present invention have found that the following requirements should be preferably met in controlling the load applied onto the slider 50 for reducing fluctuations in the amount of floatation of the slider 50. Specifically, the resonance frequency f2 of the spring 8b supporting the slider 50 on the actuator 30 should be smaller than the resonance frequency f3 of the air bearing 93 and greater than the resonance frequency f1 of the support spring 8a of the actuator 30. In other words, the wave aberration may be suitably reduced if f1<f2<f3.

Figure 9:
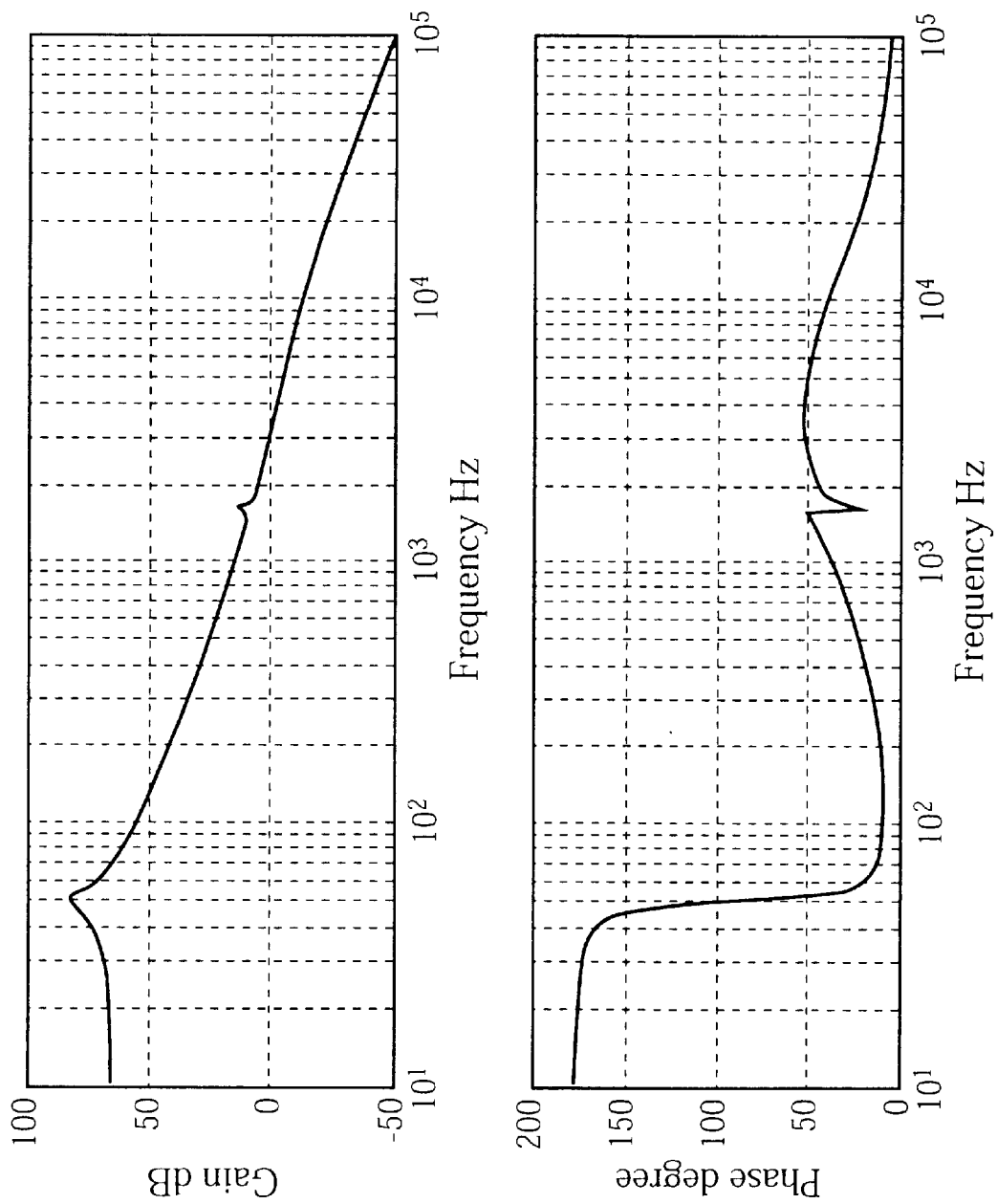
FIG. 9 includes graphs showing an open-loop characteristic of focus servo control according to the present invention.

FIG. 9 shows the results of calculation with respect to the open-loop characteristics of focus servo control, where the resonance frequency f1 of the springs 8a supporting the actuator is set at 30 Hz, the resonance frequency f2 of the support 23 (the spring 8b) supporting the slider on the actuator is set at 200 Hz, the resonance frequency f3 of the air bearing 93 (the spring 8c) is set at 1.6 kHz, and the servo band is set to 3.5 Hz. This meets the requirements f1<f2<f3. The figure shows that the calculated characteristics are more advantageous for focus servo control over the conventional focus servo open-loop characteristics although there is a slight resonance around 1.6 kHz.

Figure 10:
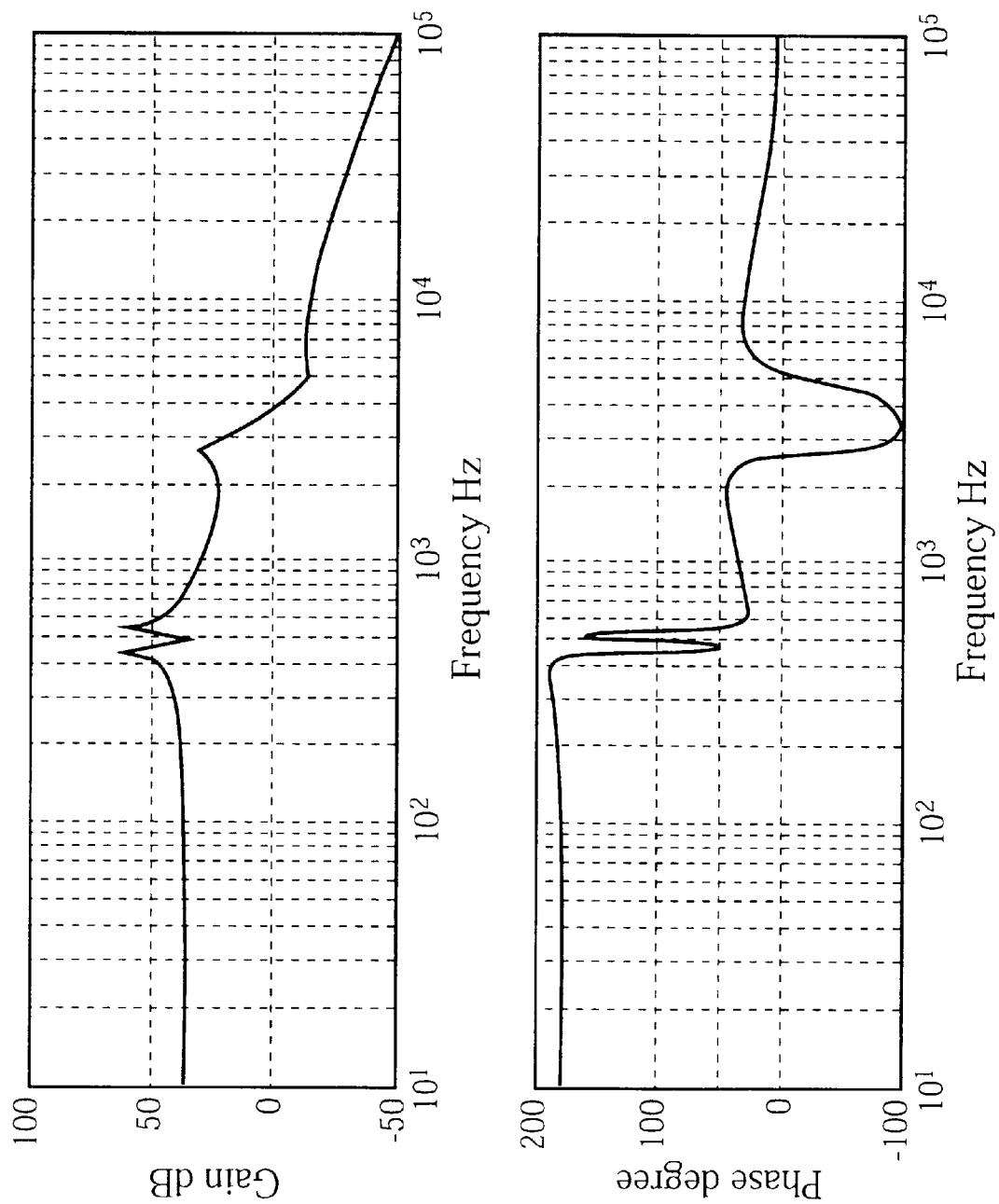
FIG. 10 includes graphs showing a comparative example of the open-loop characteristic of the focus servo control.
Figure 11:
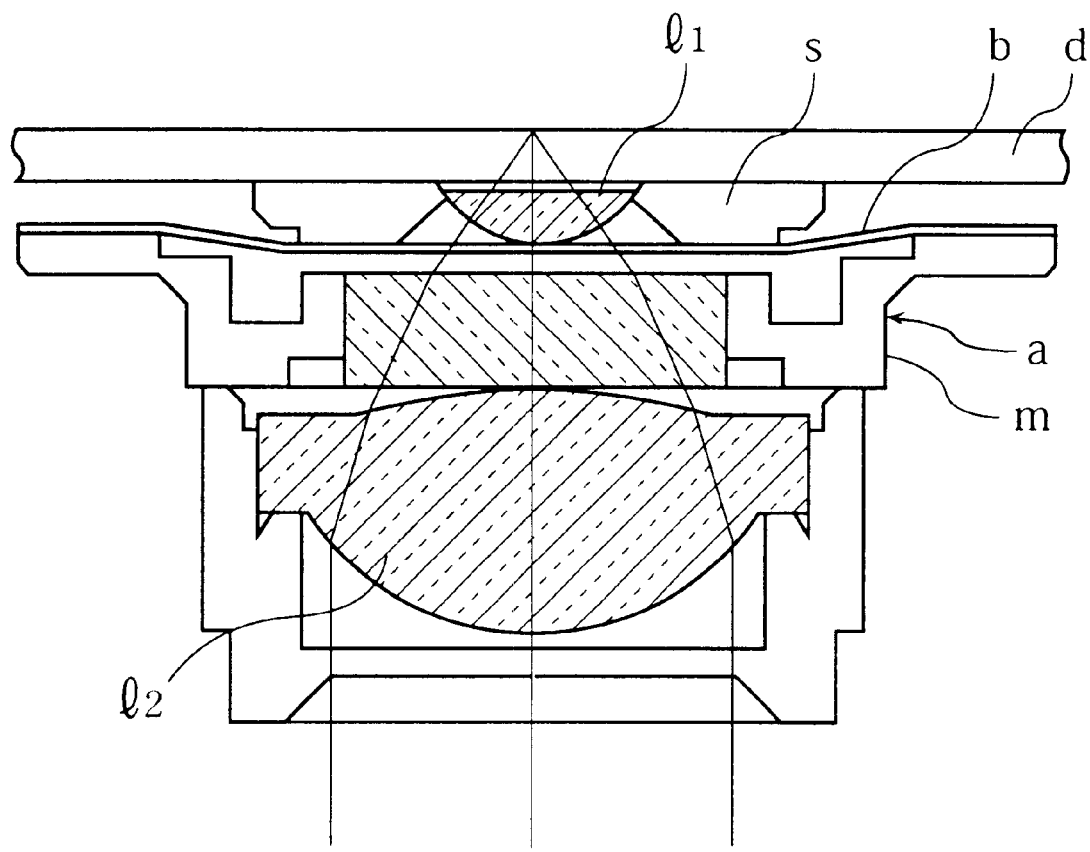
FIG. 11 is an illustrative view showing the prior art.

On the other hand, FIG. 10 shows the results of calculation with respect to the open-loop characteristic of focus servo control, where f1 is set at 30 Hz, f2 is set at 2 kHz, and f3 is set at 1.6 kHz. As understood from the figure, it is difficult to perform focus servo control because the phase changes greatly near the servo band.

Further, if f2 is smaller than f1, it is impossible to efficiently transmit, from the actuator to the slider 50, an appropriate load generated by the driving force in the focus directions. Therefore, it is impossible in this case to achieve the objective of reducing fluctuations in the amount of floatation of the slider 50 by adjusting the load applied onto the slider 50.

In this way, by performing focus servo control with the actuator 30 of the structure shown in FIG. 3 under the condition of f1<f2<f3, it becomes possible to reduce fluctuations in the amount of floatation of the slider 50 by dynamically following the fluctuations of the disc surface. Further, since the slider is supported by the support for free tilting, the slider can tilt following the tilt of the disc. This means that fluctuations in the amount of tilt of the slider relative to the disc can also be reduced.

The tracking control may be provided according to a conventional method commonly used in the optical disc drive.

What is claimed is:

1. A lens actuator of an optical head for an optical disc drive comprising: an actuator supported by a carriage via a spring and driven to displace at least in focus directions; a second lens unit including at least one lens held by the actuator; a slider supported by the actuator and floated off a turning optical disc via an air bearing; and a first lens including at least one lens and held by the slider; whereby a laser beam is focused on the optical disc by means of an object lens system which includes the first lens and the second lens;

wherein the slider is supported by the actuator via a support having a predetermined spring constant in the focus directions while also having freedom to follow tilting of the optical disc; and wherein the support for supporting the slider on the actuator has a resonance frequency higher than a resonance frequency of the spring for supporting the actuator on the carriage and lower than a resonance frequency of the air bearing formed between the slider and the optical disc.

2. The lens actuator according to claim 1, wherein the actuator is supported by the carriage via the spring for displacement not only in the focus directions but also in track directions.

3. The lens actuator according to claim 1, wherein the slider applies a load against the optical disc, the load being adjusted by controlling an electric current for driving the actuator in the focus directions.

4. The lens actuator according to claim 3, wherein the load applied onto the slider toward the optical disc is adjusted by controlling the electric current for driving the actuator in the focus directions according to a focus error signal utilized as a feedback signal.

5. The lens actuator according to claim 1, wherein the support for supporting the slider on the actuator holds the slider on two opposite sides thereof.

6. The lens actuator according to claim 1, wherein the support for supporting the slider on the actuator is spiral.

7. A lens actuator of an optical head for an optical disc drive comprising:

an actuator supported by a carriage via at least one first spring and driven to displace at least in focus directions;

a second lens unit including at least one lens held by the actuator;

a slider supported by the actuator via at least one second spring and floated off a turning optical disc via an air bearing; and a first lens including at least one lens and held by the slider, whereby a laser beam is focused on the optical disc by means of an object lens system which includes the first lens and the second lens, wherein the lens actuator further comprises a third spring interposed between the slider and said at least one second spring, the slider being supported by the actuator to follow tilting of the optical disc, and wherein said at least one second spring for supporting the slider on the actuator has a resonance frequency higher than a resonance frequency of said at least one first spring for supporting the actuator on the carriage and lower than a resonance frequency of the air bearing formed between the slider and the optical disc.

8. The lens actuator according to claim 7, wherein the actuator is supported by the carriage via said at least one first spring for displacement not only in the focus directions but also in track directions.

9. The lens actuator according to claim 7, wherein the slider applies a load against the optical disc, the load being adjusted by controlling an electric current for driving the actuator in the focus directions.

10. The lens actuator according to claim 9, wherein the load applied onto the slider toward the optical disc is adjusted by controlling the electric current for driving the actuator in the focus directions according to a focus error signal utilized as a feedback signal.

11. The lens actuator according to claim 7, wherein said at least one second spring for supporting the slider on the actuator holds the slider on two opposite slides thereof.

12. The lens actuator according to claim 7, wherein said at least one second spring for supporting the slider on the actuator is spiral.

* * * * *